(12) United States Patent  
Kazar et al.

(10) Patent No.: US 7,698,334 B2  
(45) Date of Patent: Apr. 13, 2010

(54) SYSTEM AND METHOD FOR MULTI-TIERED META-DATA CACHING AND DISTRIBUTION IN A CLUSTERED COMPUTER ENVIRONMENT

(75) Inventors: Michael Kazar, Pittsburgh, PA (US); Richard P. Jernigan, IV, Ambridge, PA (US); Richard N. Sanzi, Jr., Gibsonia, PA (US); Robert Wyckoff Hyer, Jr., Mars, PA (US)

(73) Assignee: NetApp, Inc., Sunnyvale, CA (US)

( * ) Notice: Subject to any disclaimer, the term of this patent is extended or adjusted under 35 U.S.C. 154(b) by 540 days.

(21) Appl. No.: 11/119,277

(22) Filed: Apr. 29, 2005

(65) Prior Publication Data

US 2006/0248088 A1 Nov. 2, 2006

(51) Int. Cl.  
*G06F 7/00* (2006.01)  
*G06F 17/30* (2006.01)

(52) U.S. Cl. .................. 707/737; 707/785; 707/821

(58) Field of Classification Search ................. None  
See application file for complete search history.

(56) References Cited

U.S. PATENT DOCUMENTS

| | | |
|---|---|---|
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,155,835 A | 10/1992 | Belsan |
| 5,163,131 A | 11/1992 | Row et al. |
| 5,202,979 A | 4/1993 | Hillis et al. |
| 5,355,453 A | 10/1994 | Row et al. |
| 5,485,579 A | 1/1996 | Hitz et al. |
| 5,581,724 A | 12/1996 | Belsan et al. |
| 5,623,651 A * | 4/1997 | Jernigan, IV ............ 707/206 |

(Continued)

FOREIGN PATENT DOCUMENTS

| | | |
|---|---|---|
| EP | 0 892 347 A2 | 1/1999 |
| JP | 10003440 A | 6/1998 |
| WO | WO 00/07101 A1 | 2/2000 |

OTHER PUBLICATIONS

Administration Guide found at http://www.openafs.org/pages/doc/AdminGuide/auagd010.htm, visited on Mar. 2, 2005, 34 pages.

(Continued)

*Primary Examiner*—Charles Rones  
*Assistant Examiner*—Daniel Kuddus  
(74) *Attorney, Agent, or Firm*—Cesari and McKenna, LLP

(57) ABSTRACT

A system and method caches and distributes meta-data for one or more data containers stored on a plurality of volumes configured as a striped volume set (SVS) and served by a plurality of nodes interconnected as a cluster. The SVS comprises one meta-data volume (MDV) configured to store a canonical copy of certain meta-data, including access control lists and directories, associated with all data containers stored on the SVS, and one or more data volumes (DV) configured to store, at least, data content of those containers. In addition, for each data container stored on the SVS, one volume is designated a container attribute volume (CAV) and, as such, is configured to store ("cache") a canonical copy of certain, rapidly-changing attribute meta-data, including time stamps and container length, associated with that container.

26 Claims, 17 Drawing Sheets

U.S. PATENT DOCUMENTS

| | | | |
|---|---|---|---|
| 5,701,516 | A | 12/1997 | Cheng et al. |
| 5,802,366 | A | 9/1998 | Row et al. |
| 5,819,292 | A | 10/1998 | Hitz et al. |
| 5,897,661 | A | 4/1999 | Baranovsky et al. |
| 5,931,918 | A | 8/1999 | Row et al. |
| 5,941,972 | A | 8/1999 | Hoese et al. |
| 5,963,962 | A * | 10/1999 | Hitz et al. .................. 707/202 |
| 5,987,477 | A | 11/1999 | Schmuck et al. |
| 6,032,216 | A | 2/2000 | Schmuck et al. |
| 6,038,570 | A | 3/2000 | Hitz et al. |
| 6,065,037 | A | 5/2000 | Hitz et al. |
| 6,134,293 | A * | 10/2000 | Guendel .......................... 378/4 |
| 6,173,293 | B1 | 1/2001 | Thekkath et al. |
| 6,275,898 | B1 | 8/2001 | DeKoning |
| 6,324,581 | B1 | 11/2001 | Xu et al. |
| 6,425,035 | B2 | 7/2002 | Hoese et al. |
| 6,502,166 | B1 | 12/2002 | Cassidy |
| 6,606,690 | B2 | 8/2003 | Padovano |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 * | 2/2004 | Soltis ......................... 709/217 |
| 6,721,764 | B2 * | 4/2004 | Hitz et al. .................. 707/202 |
| 6,868,417 | B2 | 3/2005 | Kazar et al. |
| 6,978,283 | B1 | 12/2005 | Edwards et al. |
| 7,055,058 | B2 | 5/2006 | Lee et al. |
| 7,159,093 | B2 * | 1/2007 | Dalal et al. ................. 711/170 |
| 7,162,486 | B2 * | 1/2007 | Patel et al. .................. 707/102 |
| 7,165,079 | B1 * | 1/2007 | Chen et al. .................. 707/202 |
| 7,165,096 | B2 | 1/2007 | Soltis |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,302,520 | B2 | 11/2007 | Kazar et al. |
| 7,366,837 | B2 | 4/2008 | Corbett et al. |
| 7,409,494 | B2 | 8/2008 | Edwards et al. |
| 7,409,497 | B1 | 8/2008 | Jernigan et al. |
| 7,412,496 | B2 | 8/2008 | Fridella et al. |
| 2002/0035668 | A1 * | 3/2002 | Nakano et al. .............. 711/114 |
| 2002/0049883 | A1 | 4/2002 | Schneider et al. |
| 2002/0078239 | A1 | 6/2002 | Howard et al. |
| 2003/0188045 | A1 | 10/2003 | Jacobson |
| 2003/0220923 | A1 | 11/2003 | Curran et al. |
| 2004/0030668 | A1 | 2/2004 | Pawlowski et al. |
| 2004/0059866 | A1 * | 3/2004 | Patel et al. .................. 711/100 |
| 2004/0122917 | A1 | 6/2004 | Menon et al. |
| 2004/0133570 | A1 * | 7/2004 | Soltis ............................ 707/3 |
| 2004/0139167 | A1 | 7/2004 | Edsall et al. |
| 2005/0044080 | A1 | 2/2005 | Fridella et al. |
| 2005/0097260 | A1 | 5/2005 | McGovern et al. |
| 2005/0120078 | A1 | 6/2005 | Kazar et al. |
| 2005/0192932 | A1 | 9/2005 | Kazar et al. |
| 2006/0184587 | A1 | 8/2006 | Federwisch et al. |
| 2007/0088702 | A1 | 4/2007 | Fridella et al. |

OTHER PUBLICATIONS

Auspex Systems, LFS—A Local File System for Multiprocessor NFS Network Servers, 1994, 6 pages.

Blasgen, M.W. et al., System R: An architectural Overview, Reprinted from IBM Systems Journal vol. 20, No. 1, 1981, Copyright 1981, 1999, 22 pages.

Borenstein, Nathaniel S., CMU's Andrew project a retrospective, Communications of ACM, 39(12), Dec. 1996, 33 pages.

Brown, Mark R. et al., The Alpine file system, ACM Transactions on Computing Systems, 3(4):261-293, Nov. 1985.

Celerra File Server Architecture for High Availability, EMC2 where information lives, Aug. 1999, 12 pages.

Chutani, Sailesh, et al., The Episode File System, In Proceedings of the USENIX Winter 1992, 18 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Fall 1991, pp. 353-385.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Morris, James H., et al., Andrew: A Distributed Personal Computing Environment, Comm. of the ACM, vol. 29, Mar. 1986, pp. 184-201.

Nelson, Michael et al., "Caching in the Sprite Network File System", ACM, Nov. 1987, pp. 3-4.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Performance Without Compromise: The Virtual Storage Architecture 1997, 11 pages.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.

Welch, Brent B., et al., Pseudo-File-Systems, Computer Science Division, Department of Electrical Engineering and Computer Sciences. Univ. of CA, Berkley, Oct. 1989, 22 pages.

West, Michael, et al. The ITC Distributed File System: Prototype and Experience, Carnegie-Mellon University, Technical Report CMU-ITC-040, Mar. 1985, 17 pages.

Carns, P. H., et al, "PVFS: A Parallel File System For Linux Clusters", Proceedings of the 4.sup.th Annual Linux Showcase and Conference, Atlanta, GA, Oct. 2000, pp. 317-327.

Hartman, J. H., et al., "Zebra: A Striped Network File System" Proceedings of the Usenix File Systems Workshop, Apr. 1998 pp. 1-9, XP002926950.

Hartman, J. H., et al. "The Zebra Striped Network File System" Dec. 1, 1993, Operating Systems Review, ACM, New York, NY, US, pp. 29-43, XP000418681, Issn: 0163-5908.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Network Appliance, Inc., Notification of Transmittal of the International Search Report and the Written Opinion of the International Searching Authority, or the Declaration, International Application No. PCT/US2005/030889, International Filing Date Aug. 31, 2005, Date of Mailing Jan. 13, 2006, 14 pages.

Ross, R. B. et al., "Using the Parallel Virtual File System", Jul. 2002, 31 pages.

Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.

Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Notification of Transmittall of the International Search Report and the Written Opinion of the International Searching Authority, or the Declaration. PCT/US2005/031220 Jan. 9, 2005.

HAMFS File System. Yoshitake Shinkai, et al. Computer System Laboratories. Nakahara-ku, Kawasaki, Japan. Jim Williams, Amdahl Corporation, Sunnyvale, California.

Notification of Transmittal of the International Search Report and the Written Opinion of the International Searching Authority, or the Declaration. PCT/US206/016055. Apr. 27, 2006.

Efficient, Distributed Data Placement Strategies for Storage Area Networks, Andrew Brinkmann, et al. XP-002404501, 2000.

Disk Subsystem Load Balancing: Disk Striping vs. Conventional Data Placement, Gregory R. Ganger, et al. Department of Electrical Engineering and Computer Science, University of Michigan, Ann Arbor. Jan. 5, 1993.

A Fast Algorith for Online Placement and Reorganization of Replicated Data, R.J. Honicky, et al. Storage Systems Research Center, University of California, Santa Cruz. Apr. 22, 2003.

A Row Permutated Data Reorganization Algorithm for Growing Server-Less Video-on-Demand Systems, T.K. Ho, et al. Department of Information Engineering, The Chinese University of Hong Knog, Shatin, N.T., Hong Kong. May 12, 2003.

* cited by examiner

SYSTEM AND METHOD FOR MULTI-TIERED META-DATA CACHING AND DISTRIBUTION IN A CLUSTERED COMPUTER ENVIRONMENT

RELATED APPLICATION

The present application is related to U.S. patent application Ser. No. 11/119,278, entitled STORAGE SYSTEM ARCHITECTURE FOR STRIPING DATA CONTAINER CONTENT ACROSS VOLUMES OF A CLUSTER, by Michael Kazar, et al., the contents of which are hereby incorporated by reference.

FIELD OF THE INVENTION

The present invention relates to clustered computer environments and, more particularly, to caching and distributing meta-data in a cluster.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. A technique for data container striping is described in the above-referenced U.S. patent application Ser. No 11/119,278, entitled STORAGE SYSTEM ARCHITECTURE FOR STRIPING DATA CONTAINER CONTENT ACROSS VOLUMES OF A CLUSTER.

In one data container striping arrangement, meta-data (e.g., time stamps, file length and access control lists, (ACL) associated with a data container (e.g., a file) may also be striped across (or stored on) each volume of the SVS. However, a disadvantage of this arrangement involves the latency incurred when acquiring and updating such meta-data needed to service a data access request directed to the file. For example, changes to the meta-data resulting from servicing of the request may need to be propagated to every volume. This substantially increases the number of accesses to the storage systems serving the volumes, thereby adversely impacting the processing capabilities available for servicing other client data access requests.

An alternative arrangement may be to designate a single volume of the SVS as a meta-data volume (MDV) configured to store a canonical (i.e., definitive) copy of the meta-data associated with all files stored on the SVS. Here, each storage system hosting a SVS volume and servicing a data access request directed to a file is required to contact the MDV in order to ascertain and update the status of meta-data associated with the file. This arrangement places a substantial load on the storage system serving the MDV with a concomitant decrease in system performance. Moreover, depending on the load of the SVS, the meta-data requests to/from the MDV may become a bottleneck, causing certain storage systems to stall (wait) until their meta-data requests have been processed before servicing client data access requests.

SUMMARY OF THE INVENTION

The present invention overcomes the disadvantages of the prior art by providing a system and method for caching and distributing meta-data for one or more data containers stored on a plurality of volumes configured as a striped volume set (SVS) and served by a plurality of nodes interconnected as a cluster. To that end, the SVS comprises one meta-data volume (MDV) configured to store a canonical copy of certain meta-data, including access control lists and directories, associated with all data containers stored on the SVS, and one or more data volumes (DV) configured to store, at least, data content of those containers. In addition, for each data container stored on the SVS, one volume is designated a container attribute volume (CAV) and, as such, is configured to store a canonical copy of certain, rapidly-changing attribute meta-data, including time stamps and container length, associated with that container.

According to an aspect of the invention, the meta-data are organized into various categories (e.g., MD1-MD3) along functional boundaries and are resident on various volumes to optimize data access (e.g., read and write) paths through the SVS. These categories include (i) MD1 meta-data that changes on every data access (read/write) request served by the SVS, (ii) MD2 meta-data that may be retrieved (but not changed) on every request and (iii) MD3 meta-data that is unused for the read/write requests. Since it changes on every read/write request served by the DVs of the SVS, the MD1 meta-data is canonically resident on the CAV and generally cached on the DVs. Likewise, since it may be retrieved, but does not change, on every request served by the DVs, the MD2 meta-data is canonically resident on the MDV and generally cached on all DVs of the SVS, including the volume designated as CAV. Finally, since it is unused for a read/write request, the MD3 meta-data is canonically, and solely, resident on the MDV.

According to another aspect of the invention, the CAV cooperates with the MDV and DVs of the SVS to provide a multi-tier caching and distribution architecture that offloads meta-data access requests that would otherwise be directed to the MDV. Here, the CAV is utilized as a first tier caching and distribution point for storing and distributing most meta-data, e.g., MD1 and MD2, for use by the DVs of the SVS. In the case of the MD1 meta-data, the multi-tier caching and distribution architecture enables the DVs to constantly access the CAV for meta-data changes that occur on every read/write request. The MD1 access path is relatively "short" and, notably, offloads all such frequent requests from the MDV. In the case of MD2 meta-data, the multi-tier caching and distribution architecture enables the DV to access the CAV for meta-data retrieved on every read/write request. In general, the MD2 access path terminates at the CAV for current meta-data; however, since it does not store a canonical copy of the MD2 meta-data, the CAV may have to acquire a current version of the meta-data from the MDV if its copy is invalid.

Advantageously, the present invention facilitates (i) propagating of meta-data throughout the nodes of the cluster for storage on various volumes ("caches") of the SVS and (ii) updating of those caches in an efficient manner. That is, the novel multi-tier caching and distribution architecture reduces the latency incurred when acquiring and updating such meta-data needed to service a data access request directed to a data container to thereby provide a high-performance cluster.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
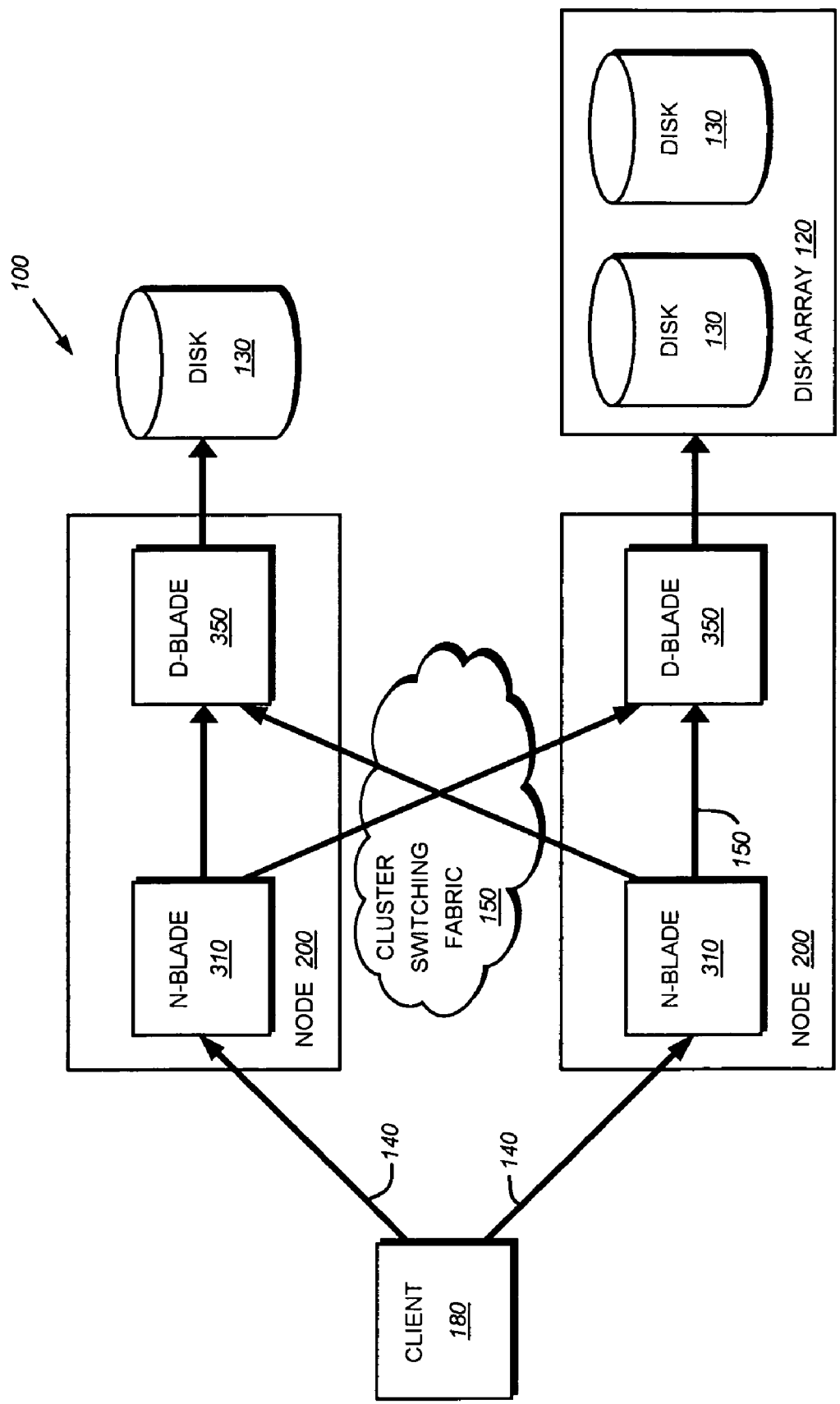
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
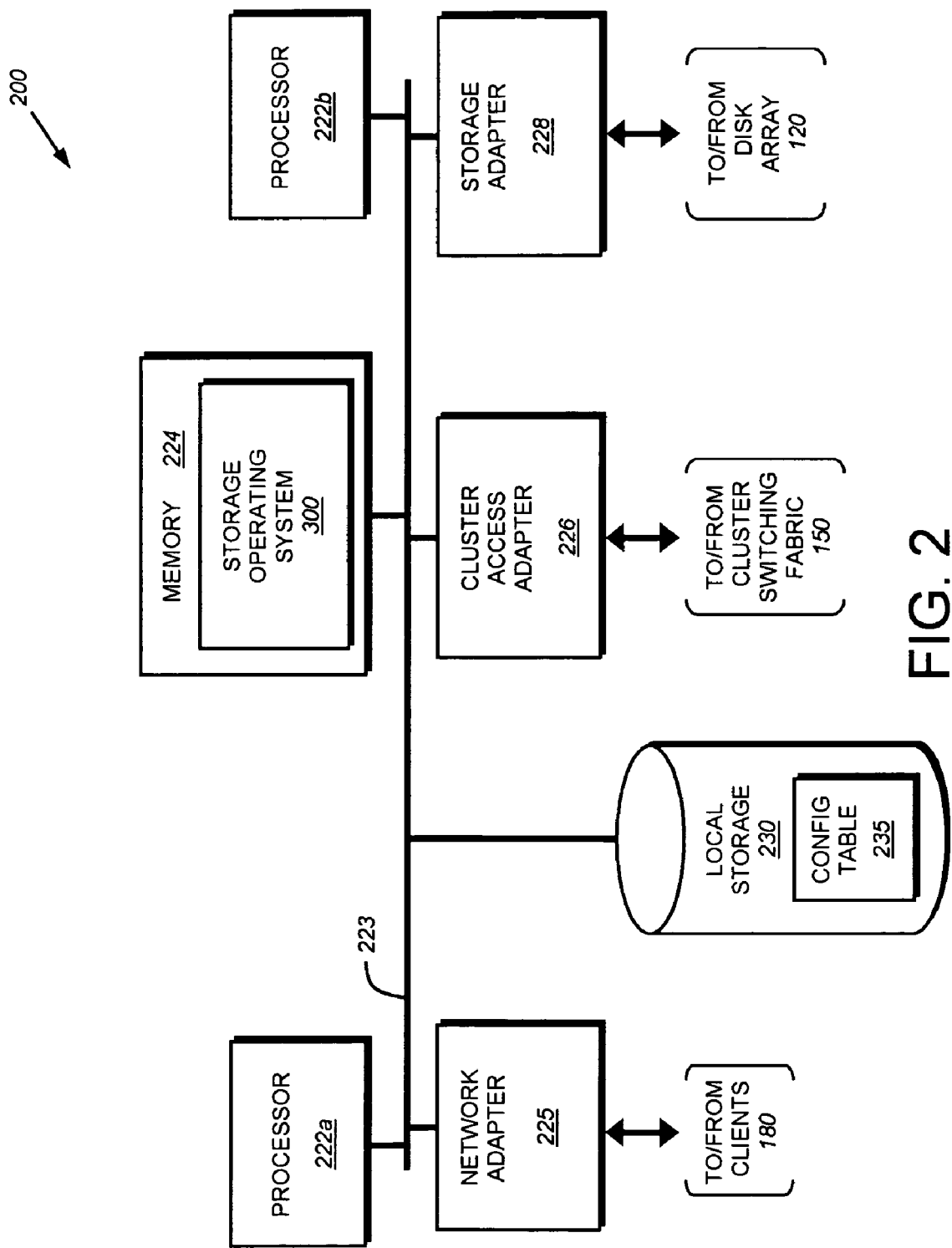
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or is more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
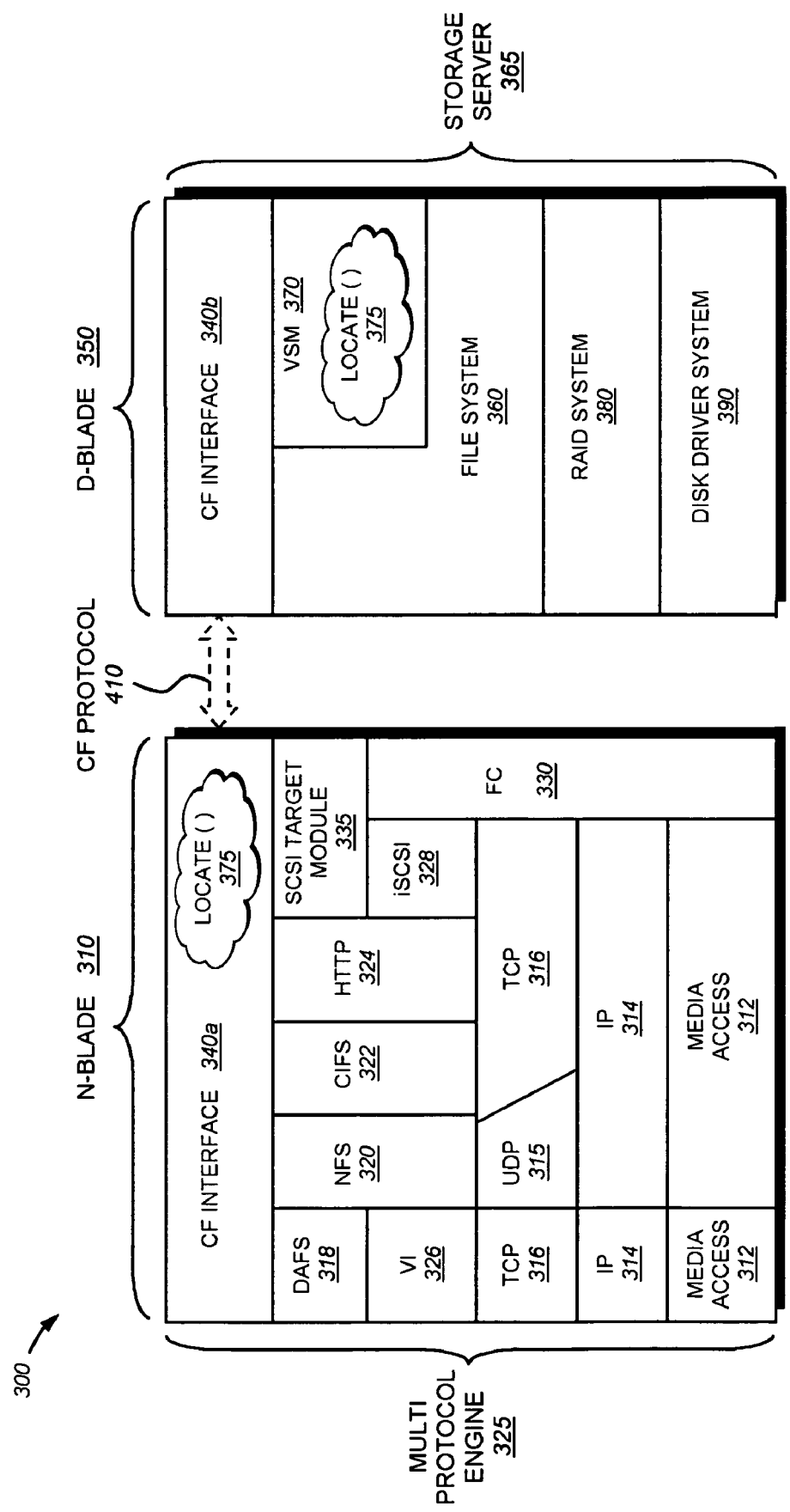
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) of the present invention. As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, is each blade includes a cluster fabric (CF) interface module 340a,b adapted to implement intra-cluster communication among the blades, including D-blade-to-D-blade communication for data container striping operations described herein.

The protocol layers, e.g., the NFS/CIFS layers and the iSCSI/FC layers, of the N-blade 310 function as protocol servers that translate file-based and block based data access requests from clients into CF protocol messages used for communication with the D-blade 350. That is, the N-blade servers convert the incoming data access requests into file system primitive operations (commands) that are embedded within CF messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command.

Figure 4:
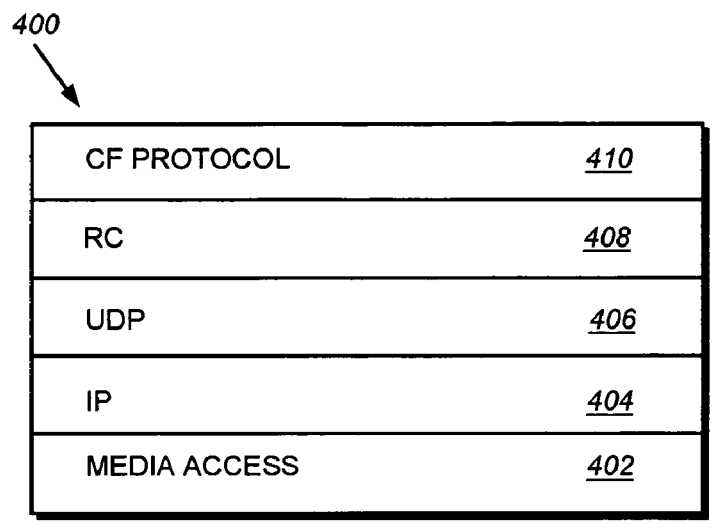
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote blades of the cluster 100; however, it should be understood that the term "CF message" may be used generally to refer to LPC and RPC communication between blades of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-blade 310) to a destination (e.g., a D-blade 350). The RC layer 408 implements a reliable transport protocol that is adapted to process such envelopes in accordance with a connectionless protocol, such as UDP 406.

Figure 5:
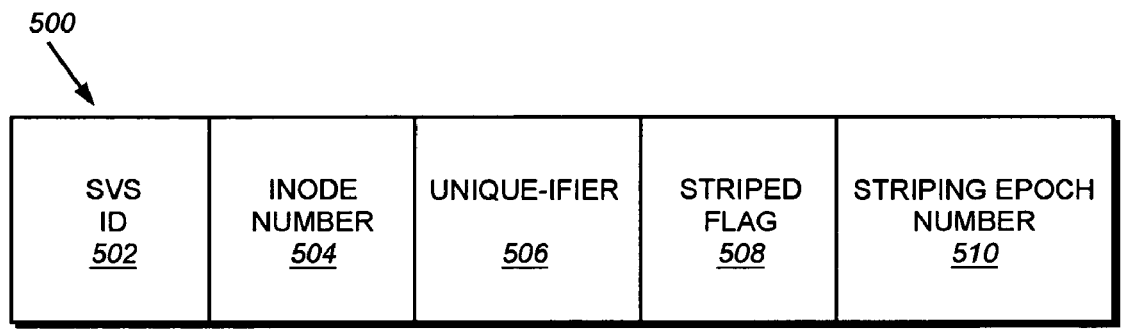
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
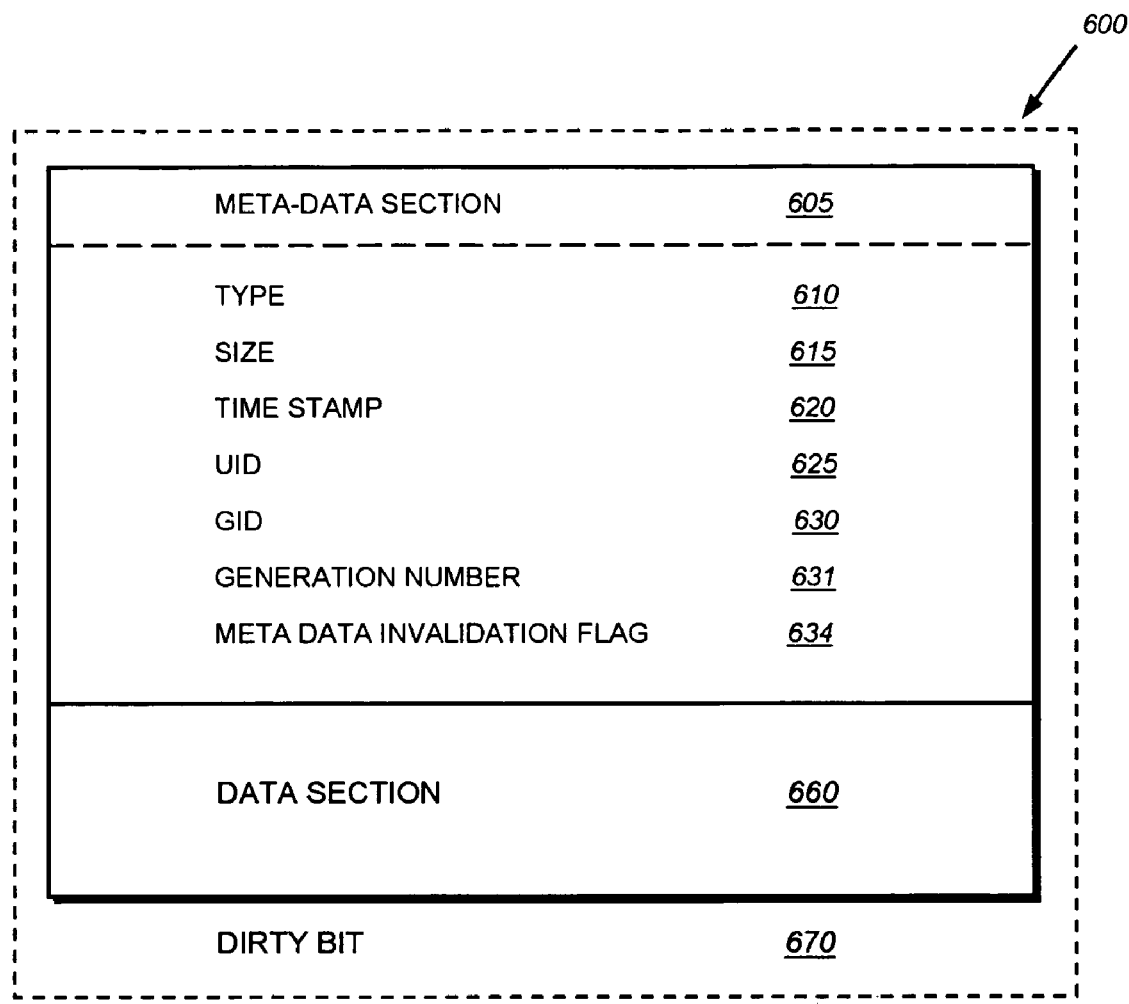
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 650. As described further herein, meta-data invalidation flag field 634 is used to indicate whether meta-data in the inode is usable or whether it should be re-acquired from the MDV. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 660 of the inode (e.g., a second level inode) references an indirect block (e.g., a first level L1 block) that contains 1024 pointers, each of which references a 4 kB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819, 292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
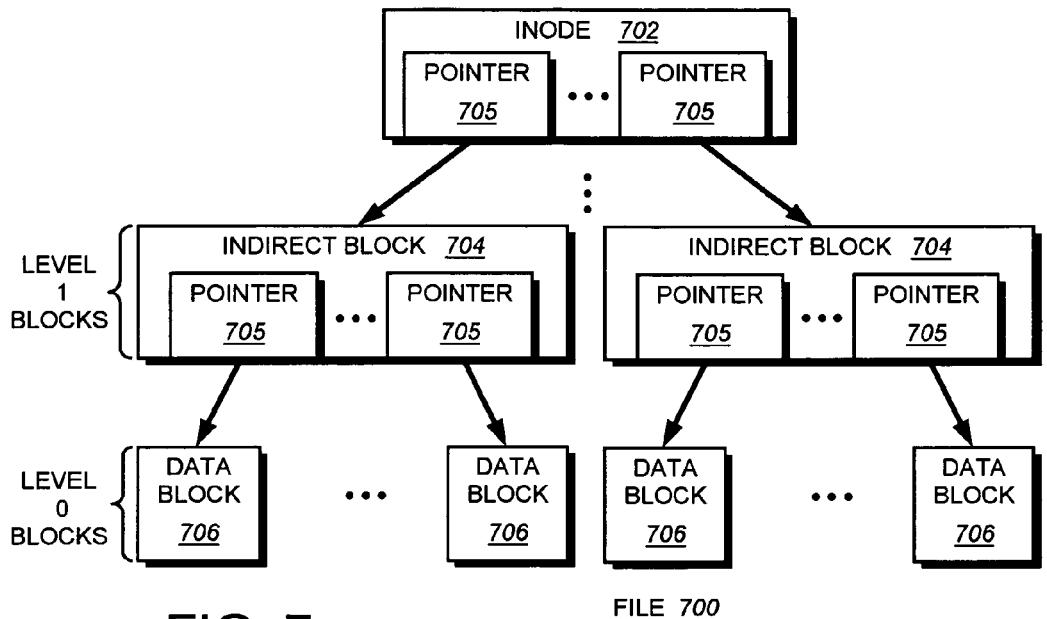
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
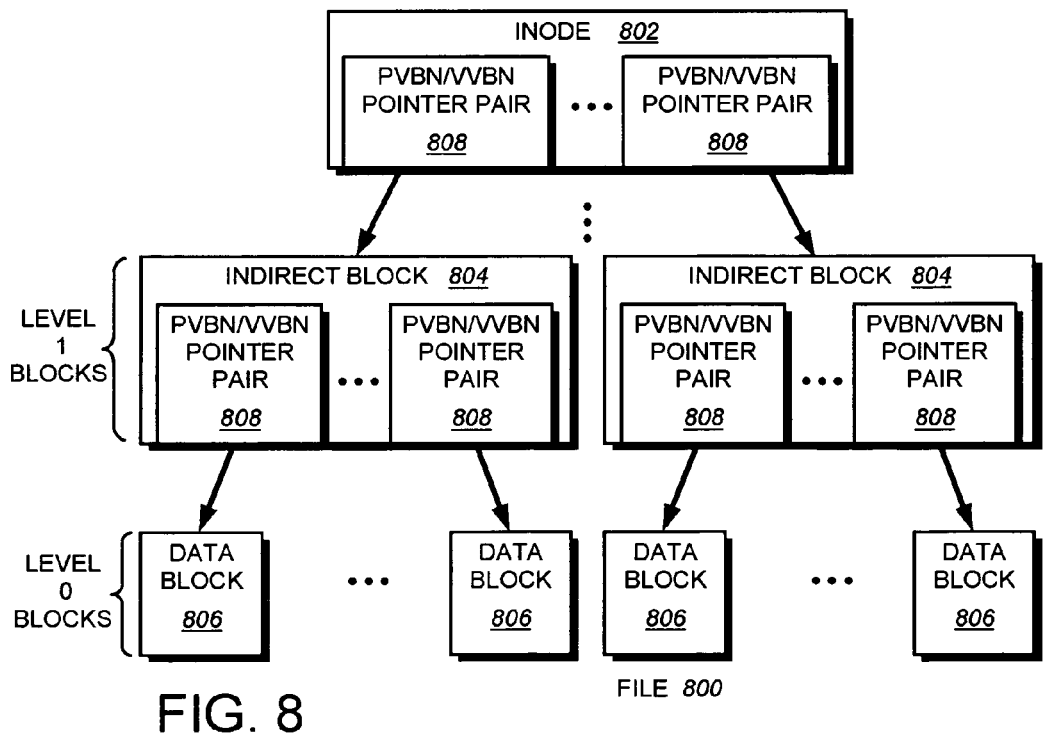
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

Figure 9:
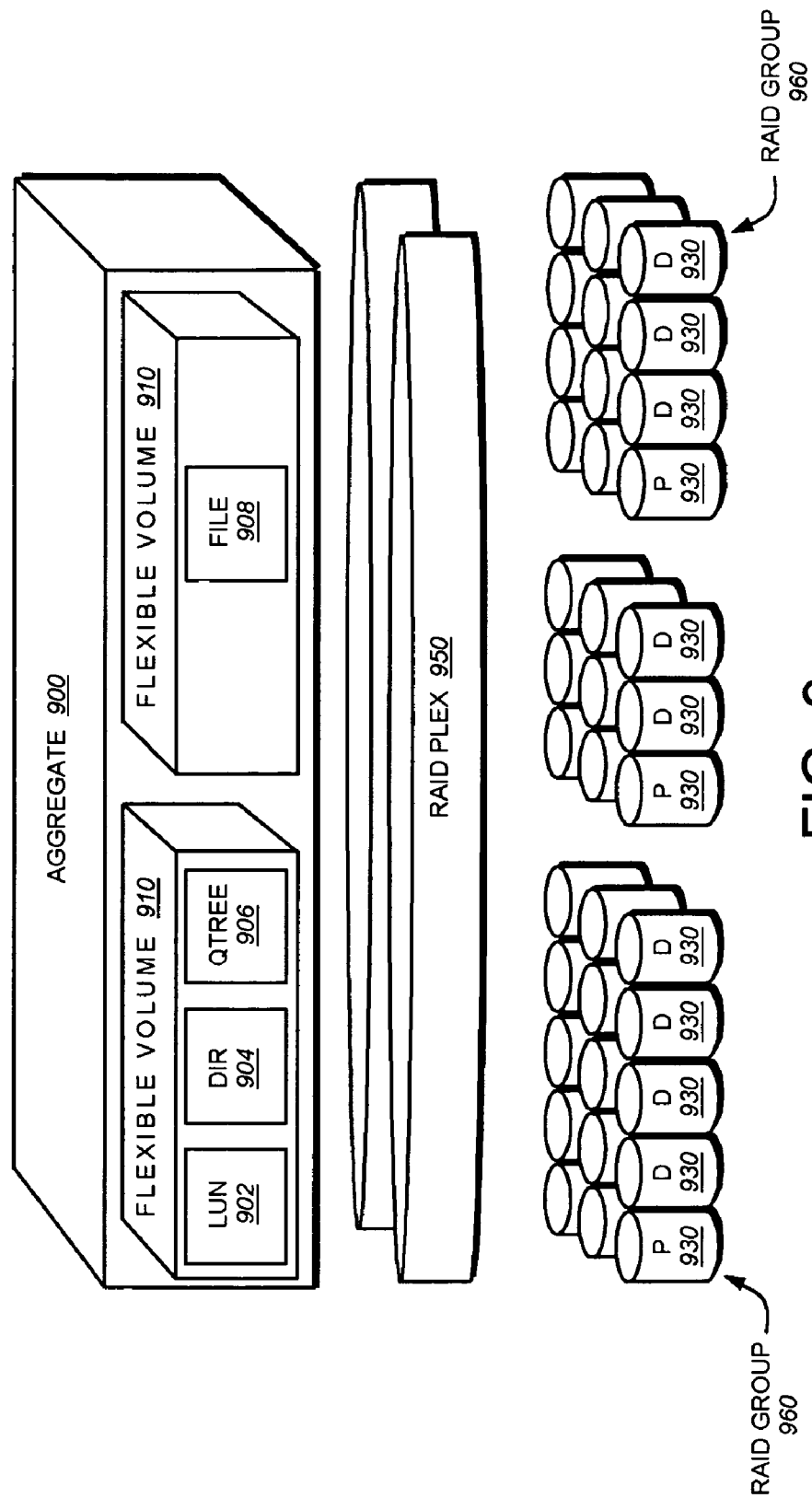
FIG. 9 is a schematic block diagram of an exemplary aggregate in accordance with an embodiment of the present invention.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available. FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem File, Storage Label File

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
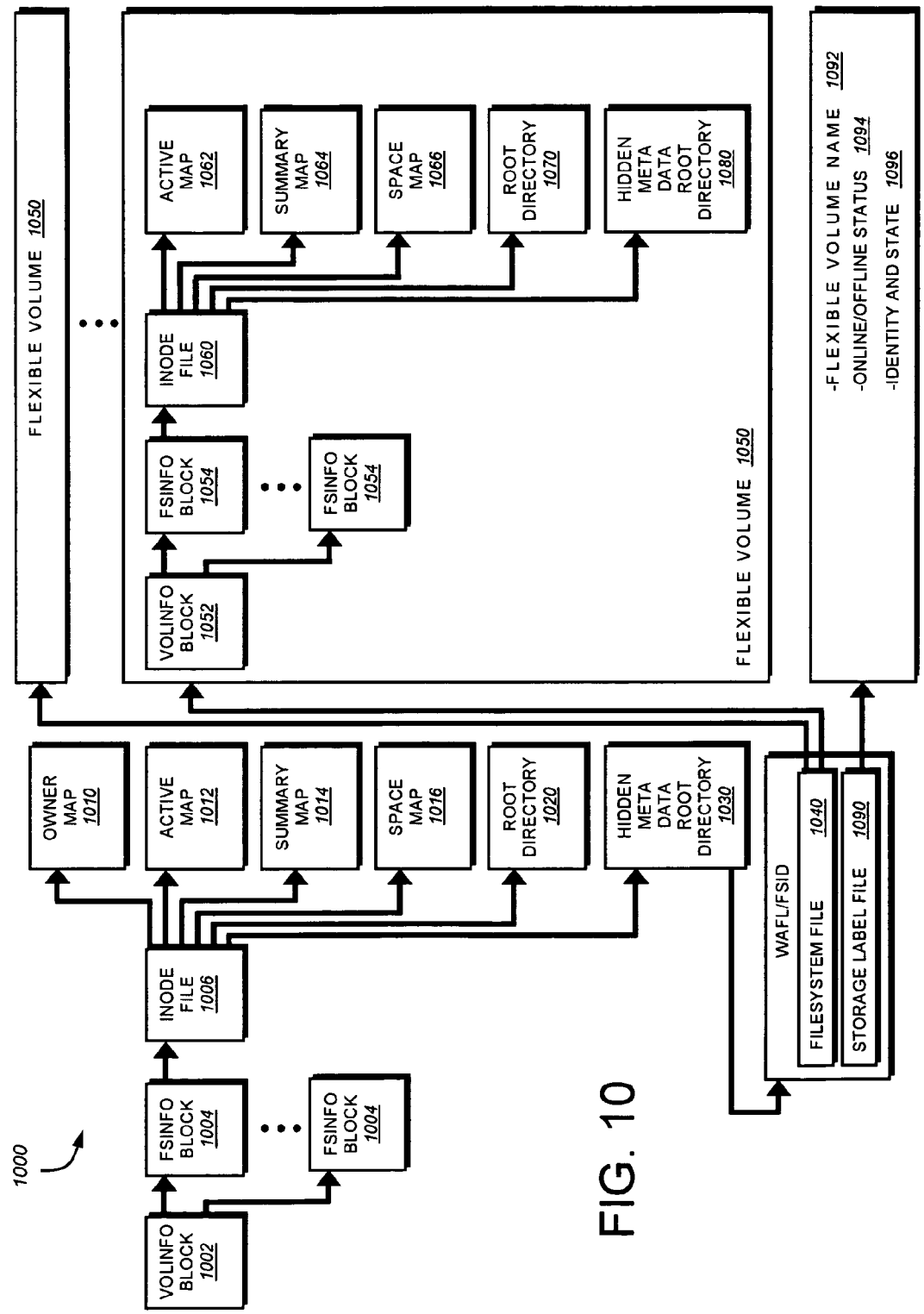
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
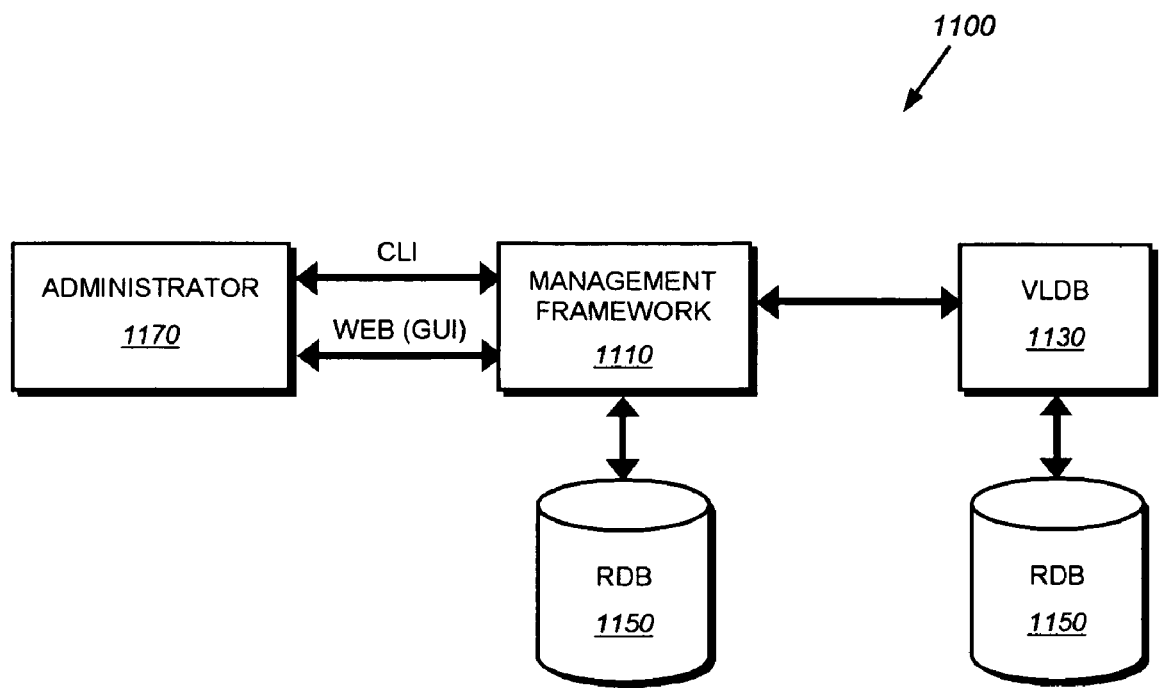
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-blade 310 of each node accesses a configuration table 235 that maps the SVS ID 502 of a data container handle 500 to a D-blade 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
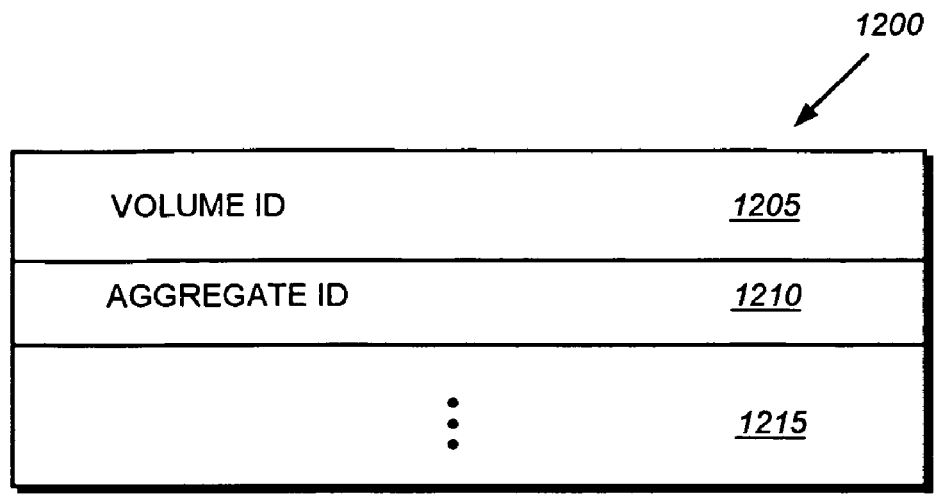
FIG. 12 is a schematic block diagram of a volume location database (VLDB) volume entry in accordance with an embodiment of the present invention.
Figure 13:
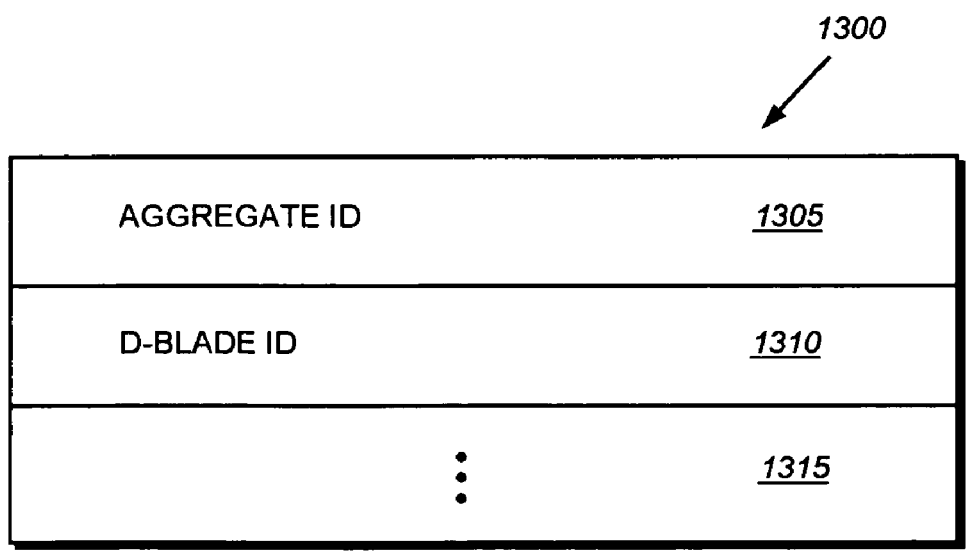
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-blade ID field 1310 and, in alternate embodiments, additional fields 1315. The aggregate ID field 1305 contains an ID of a particular aggregate 900 in the cluster 100. The D-blade ID field 1310 contains an ID of the D-blade hosting the particular aggregate identified by the aggregate ID field 1305.

The VLDB illustratively implements a RPC interface, e.g., a Sun RPC interface, which allows the N-blade 310 to query the VLDB 1130. When encountering contents of a data container handle 500 that are not stored in its configuration table, the N-blade sends an RPC to the VLDB process. In response, the VLDB 1130 returns to the N-blade the appropriate mapping information, including an ID of the D-blade that owns the data container. The N-blade caches the information in its configuration table 235 and uses the D-blade ID to forward the incoming request to the appropriate data container. All functions and interactions between the N-blade 310 and D-blade 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

The present invention is related to a storage system architecture illustratively comprising two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

The SVS comprises a meta-data volume (MDV) and one or more data volumes (DV). The MDV is configured to store a canonical, or definitive, copy of certain meta-data, including access control lists (ACLs) and directories, associated with all files stored on the SVS, whereas each DV is configured to store, at least, data content of those files. For each file stored on the SVS, one volume is designated the container attribute volume (CAV) and, to that end, is configured to store ("cache") certain, rapidly-changing attribute meta-data, including time stamps and file length, associated with that file to thereby offload access requests that would otherwise be directed to the MDV. In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In alternate embodiments, data for files is striped across the MDV and the DVs.

Figure 14:
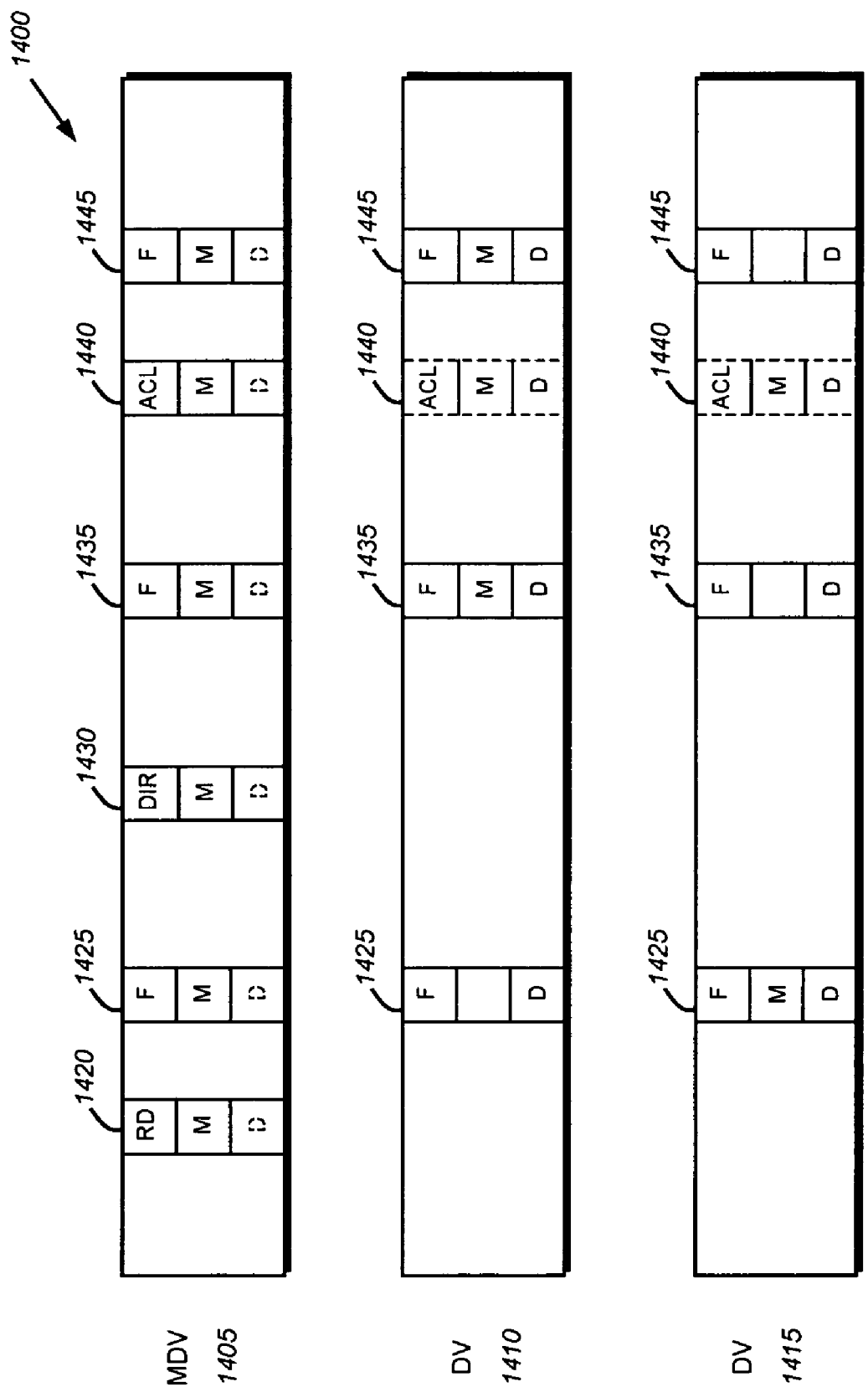
FIG. 14 is a schematic block diagram of a striped volume set (SVS) in accordance with an embodiment of the present invention.

FIG. 14 is a schematic block diagram of the inode files of an SVS 1400 in accordance with an embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a plurality of inodes, including a root directory (RD) inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include data (D); however, in alternate embodiments, the MDV may include user data.

In contrast, each DV 1410, 1415 stores only file (F) inodes 1425, 1435, 1445 and ACL inode 1440. According to the inventive architecture, a DV does not store directories or other device inodes/constructs, such as symbolic links; however, each DV does store F inodes, and may store cached copies of ACL inodes, that are arranged in the same locations as their respective inodes in the MDV 1405. A particular DV may not store a copy of an inode until an I/O request for the data container associated with the inode is received by the D-Blade serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time stamps 620.

Figure 15:
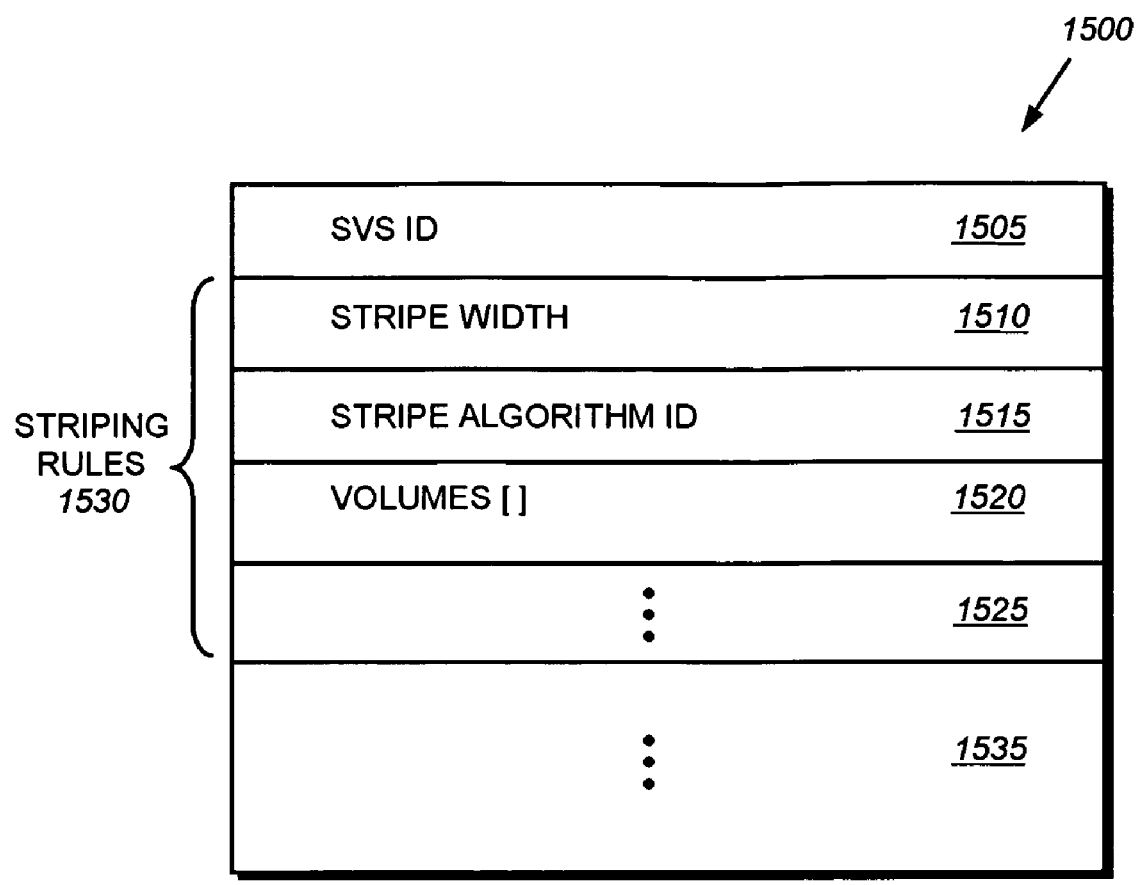
FIG. 15 is a schematic block diagram of a VLDB SVS entry in accordance with an embodiment the present invention.

The SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 15 is a schematic block diagram of an exemplary VLDB SVS entry 1500 in accordance with an embodiment of the present invention. The VLDB entry 1500 includes a SVS ID field 1505 and one or more sets of striping rules 1530. In alternate embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe. The ordered list of volumes field 1520 contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

A Locate( ) function 375 is provided that enables the VSM 370 and other modules (such as those of N-blade 310) to locate a D-blade 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 180 and received at the N-blade 310 of a node 200, where it is parsed through the multi-protocol engine 325 to the appropriate protocol server of N-blade 310.

To determine the location of a D-blade 350 to which to transmit a CF message 400, the N-blade 310 may first retrieve a SVS entry 1500 to acquire the striping rules 1530 (and list of volumes 1520) associated with the SVS. The N-blade 310 then executes the Locate( ) function 375 to identify the appropriate volume to which to direct an operation. Thereafter, the N-Blade may retrieve the appropriate VLDB volume entry 1200 to identify the aggregate containing the volume and the appropriate VLDB aggregate entry 1300 to ultimately identify the appropriate D-blade 350. The protocol server of N-blade 310 then transmits the CF message 400 to the D-blade 350.

Figure 16:
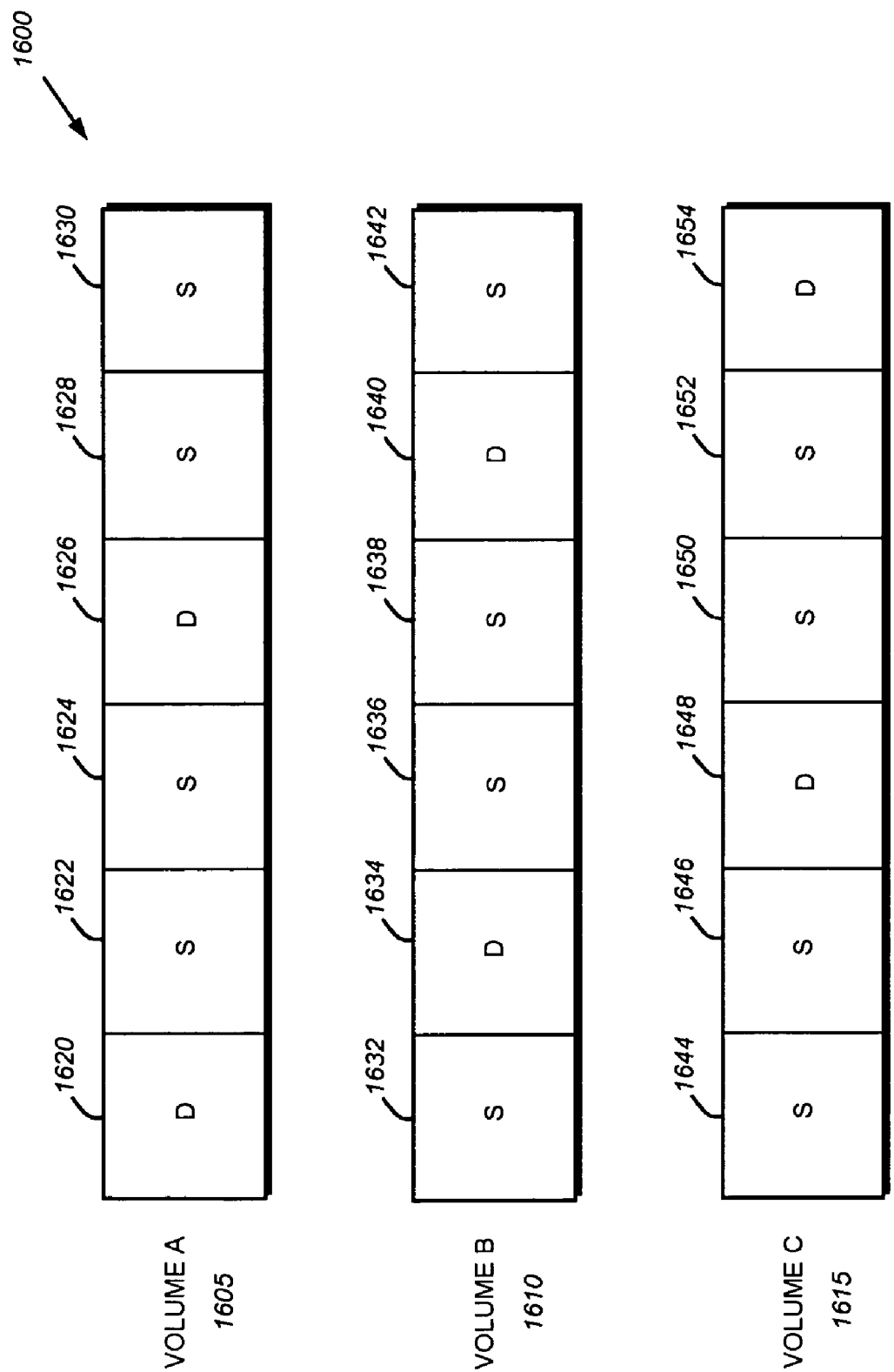
FIG. 16 is a schematic block diagram illustrating the periodic sparseness of file content stored on volumes of a SVS in accordance with an embodiment of the present invention.

FIG. 16 is a schematic block diagram illustrating the periodic sparseness of file content stored on volumes A 1605, B 1610 and C 1615 of SVS 1600. As noted, file content is periodically sparse according to the SVS striping rules, which specify a striping algorithm (as indicated by stripe algorithm ID field 1515) and a size/width of each stripe (as indicated by stripe width field 1510). Note that, in the illustrative embodiment, a stripe width is selected to ensure that each stripe may accommodate the actual data (e.g., stored in data blocks 806) referenced by an indirect block (e.g., level 1 block 804) of a file.

In accordance with an illustrative round robin striping algorithm, volume A 1605 contains a stripe of file content or data (D) 1620 followed, in sequence, by two stripes of sparseness (S) 1622, 1624, another stripe of data (D) 1626 and two stripes of sparseness (S) 1628, 1630. Volume B 1610, on the other hand, contains a stripe of sparseness (S) 1632 followed, in sequence, by a stripe of data (D) 1634, two stripes of sparseness (S) 1636, 1638, another stripe of data (D) 1640 and a stripe of sparseness (S) 1642. Volume C 1615 continues the round robin striping pattern and, to that end, contains two stripes of sparseness (S) 1644, 1646 followed, in sequence, by a stripe of data (D) 1648, two stripes of sparseness (S) 1650, 1652 and another stripe of data (D) 1654.

H. Meta-data Caching and Distribution

The present invention is directed to a system and method for caching and distributing meta-data for one or more data containers stored on a plurality of volumes configured as a SVS. As noted, the SVS comprises one MDV configured to store a canonical copy of certain meta-data, including access control lists and directories, associated with all data containers stored on the SVS, and one or more DVs configured to store, at least, data content of those containers. In addition, for each data container stored on the SVS, one volume is designated the CAV and, as such, is configured to store ("cache") a canonical copy of certain, rapidly-changing attribute meta-data, including time stamps and container length, associated with that container.

Figure 17:
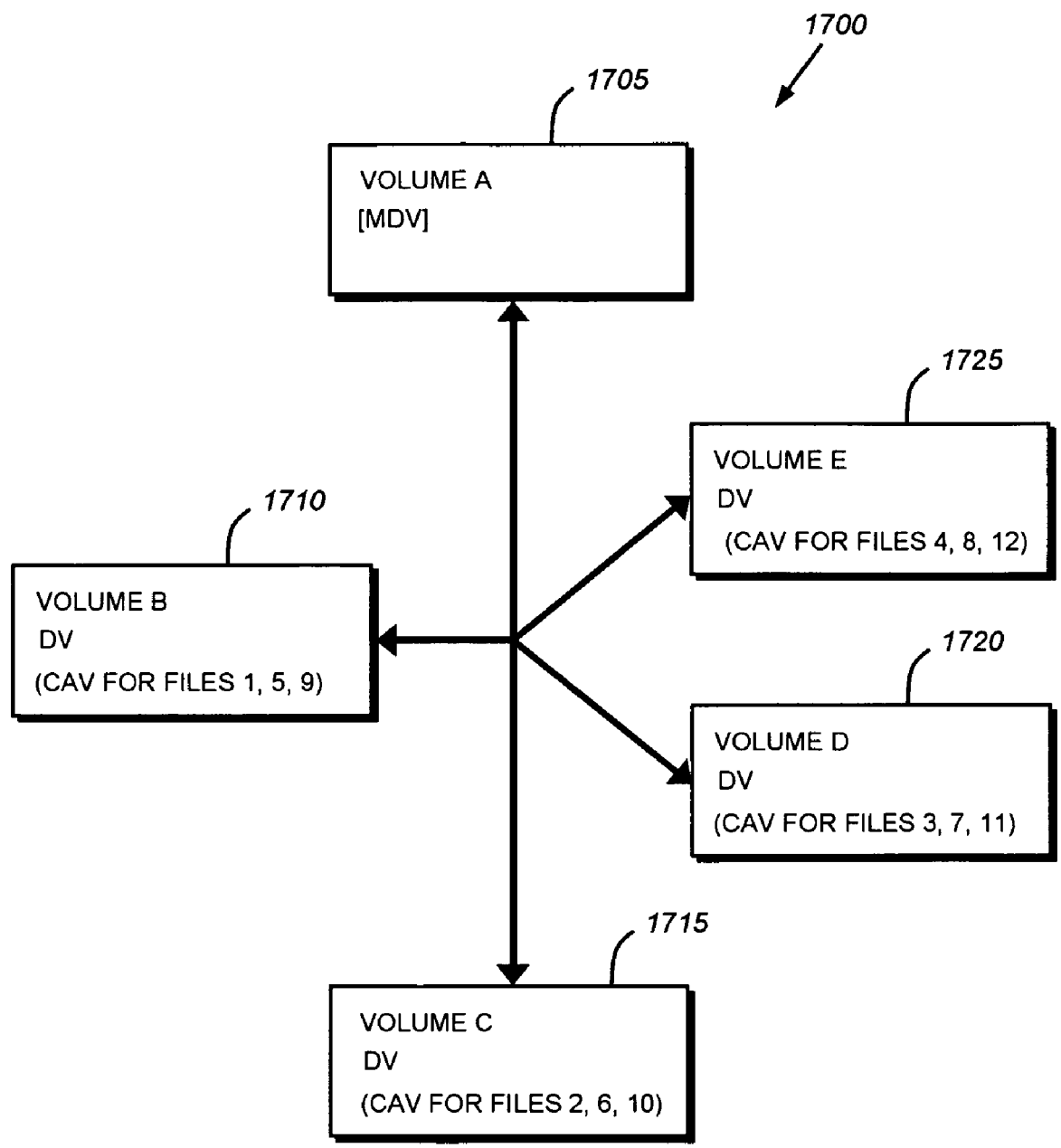
FIG. 17 is a schematic block diagram of an exemplary striped volume set in accordance with an embodiment of the present invention.

FIG. 17 is a schematic block diagram of an exemplary five volume SVS environment 1700 in accordance with an embodiment the present invention. The SVS 1700 comprises five volumes, namely volume A 1705, volume B 1710, volume C 1715, volume D 1720 and volume E 1725. It should be noted that five volumes are shown for illustrative purposes only and that the teachings of the present invention may be utilized with SVSs having any number of volumes. In the illustrative environment 1700, volume A 1705 is designated the MDV, with the other four volumes functioning as DVs associated with the SVS.

Twelve data containers, e.g., files (files 1-12), are illustratively stored on the volumes of the SVS, wherein each volume serves as the CAV for any file whose first stripe is stored therein. Notably, the CAV is a role that the MDV or DV serves for a particular file to store (and serve) rapidly-changing attribute meta-data for the file. Thus, for example, volume B 1710 serves as the CAV for files 1, 5, 9. Similarly, volume C 1715 serves as the CAV for files 2, 6 and 10, volume D 1720 serves as the CAV for files 3, 7 and 11 and volume E serves as the CAV for files 4, 8 and 12. Volume A 1705, which serves as the MDV for the SVS does not, in the illustrative embodiment, serve as the CAV for any files. In alternate embodiments, the MDV may serve as the CAV for files. By distributing the role of the CAV among the SVS volumes, each volume serves as a CAV for an approximately equal number of files.

According to an aspect of the invention, the meta-data associated with the files stored on the SVS are organized into various categories (e.g., MD1-MD3) along functional boundaries and are resident on various volumes to optimize data access (e.g., read and write) paths through the SVS. These categories include (i) MD1 meta-data that changes on every data access (read/write) request served by the SVS, (ii) MD2 meta-data that may be retrieved (but not changed) on every request and (iii) MD3 meta-data that is unused for the read/write requests. Since it changes on every read/write request served by the DVs of the SVS, the MD1 meta-data is canonically resident on the CAV and generally cached on the DVs. Likewise, since it may be retrieved, but does not change, on every request served by the DVs, the MD2 meta-data is canonically resident on the MDV and generally cached on all DVs of the SVS, including the volume designated as CAV. Finally, since it is unused for a read/write request, the MD3 meta-data is canonically, and solely, resident on the MDV. Table 1 illustrates the various categories and residences of meta-data according to the present invention.

TABLE 1

| Type | When Utilized | Where Stored | Examples of Meta-Data |
| --- | --- | --- | --- |
| MD1 | Changes on every Read/Write | Canonical copy on CAV Cached at each DV and MDV | File length Access Time |
| MD2 | Read for Read/Write Operations | Canonical copy at MDV Cached at all DVs | Access Control Lists Lock State Ownership |
| MD3 | Not Used for Read/Write Operations | Canonical copy on MDV | Link Count |

Figure 18:
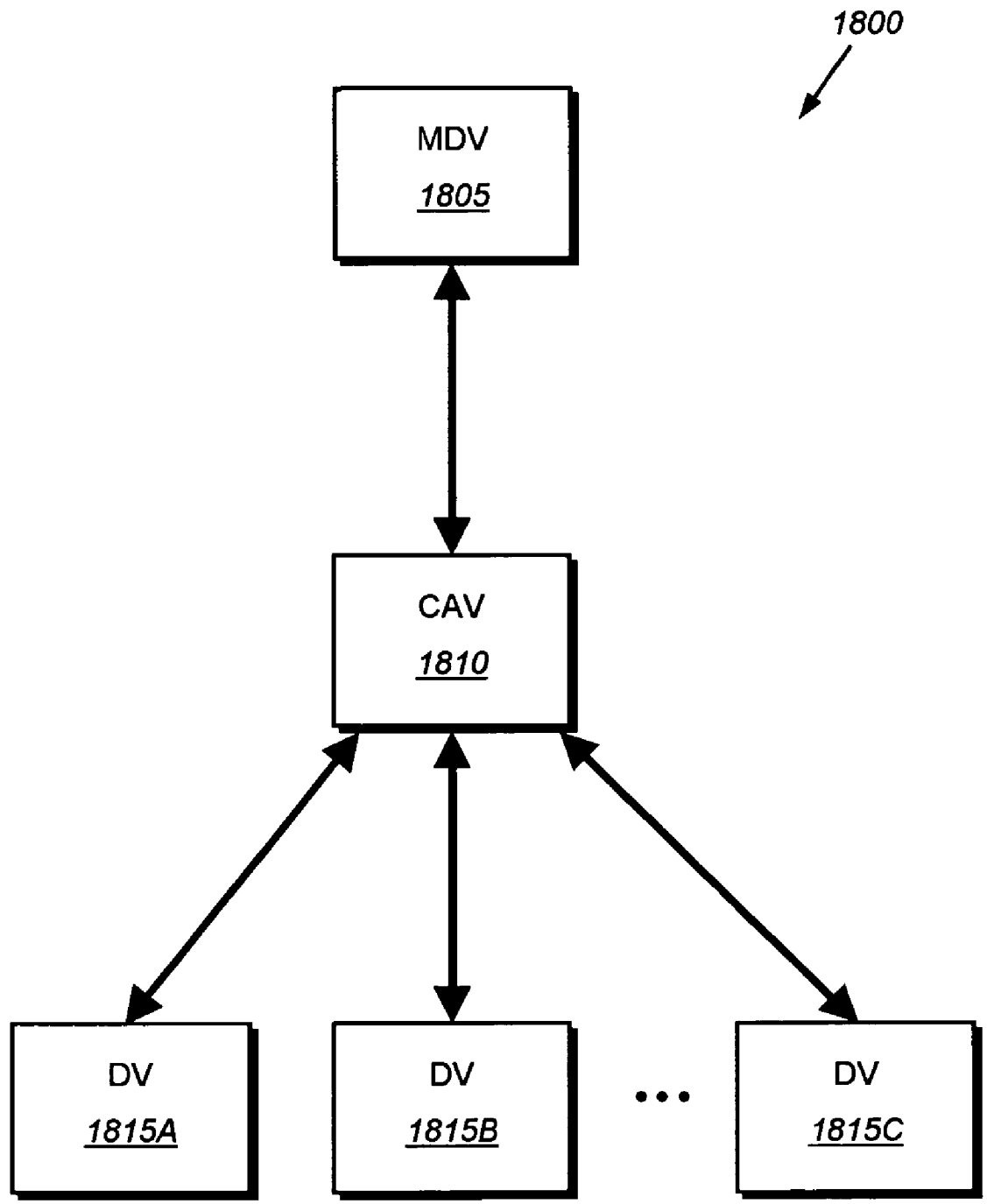
FIG. 18 is a schematic block diagram of an exemplary striped volume set in accordance with an embodiment of the present invention

According to another aspect of the invention, the CAV cooperates with the MDV and DVs of the SVS to provide a multi-tier caching and distribution architecture that offloads meta-data access requests that would otherwise be directed to the MDV. FIG. 18 is a schematic block diagram of an exemplary multi-tier meta-data caching and distribution hierarchical environment 1800 in accordance with an embodiment of the present invention. As noted, MDV 1805 stores a canonical copy of MD2 and MD3 meta-data for all of the files stored on the SVS. Here, the CAV is utilized as a first tier caching and distribution point for storing and distributing most meta-data, e.g., MD1 and MD2, for use by the DVs 1815.

As noted above, every volume within the SVS serves as a CAV for a portion of the files stored on the SVS. Illustratively, the volume storing the first stripe of the file is deemed to be the CAV. Thus, different volumes of the environment 1800 may serve as the CAV 1810 depending on the particular files. Moreover, the MDV may serve as the CAV for certain files. In such a case, the roles of the CAV and MDV are merged due to the fact that the volume contains a canonical copy of all (MD1-MD3) meta-data. For those files stored on a SVS volume having a merged CAV/MDV role, no first tier caching and distribution point is utilized in the hierarchical environment 1800.

In the illustrative embodiment, the multi-tier caching and distribution architecture facilitates propagating of meta-data throughout the nodes of the cluster for storage on various volumes ("caches") of the SVS and updating of those caches in an efficient manner that ensures cache consistency in the cluster. As for the latter, a "pull" model is illustratively employed for cache updates. That is, the meta-data stored on a particular data volume is deemed to be valid unless it has been explicitly invalidated by, for example, assertion of the meta-data invalidation flag 634. In response to assertion of the invalidation flag, the volume (e.g., CAV or DV) queries its "higher-level" volume of the hierarchy (e.g., MDV or CAV, respectively) to obtain (pull) a valid copy of the meta-data in order to update its cache.

In the case of the MD1 meta-data, the multi-tier caching and distribution architecture enables the DVs to constantly access the CAV for meta-data changes that occur on every read/write request. The MD1 access path of the caching and distribution hierarchy 1800 is relatively "short" and, notably, offloads all such frequent requests from the MDV. In the case of MD2 meta-data, the multi-tier caching and distribution architecture enables the DV to access the CAV for meta-data retrieved on every read/write request. In general, the MD2 access path of the hierarchy terminates at the CAV for current MD2 meta-data; however, since it does not store a canonical copy of that meta-data, the CAV may have to acquire a current version of the MD2 meta-data from the MDV if its copy is invalid.

It should be noted that meta-data cached locally at each volume may be deemed to be valid unless certain conditions have been met. As noted, one of these conditions is that the meta-data has not been explicitly invalidated, by, for example, assertion of the meta-data invalidation flag 634 of the inode stored on each data volume. Another condition is that the data volumes may have a set of rules to ensure cache consistency in addition to the requirements of checking for explicit invalidation. One such technique to ensure cache consistency is described in the U.S. patent application Ser. No. 11/261,007, entitled SYSTEM AND METHOD FOR GUARANTEEING CACHE CONSISTENCY IN A CLUSTER, by Richard Jernigan at al, the contents of which are hereby incorporated by reference.

In the illustrative embodiment, all commands for a file stored on the SVS that modify and/or create an attribute of the file are directed to the MDV. In response, the MDV instructs the CAV to invalidate its cached copy of the meta-data by, e.g., asserting the meta-data invalidation flag in the inode of the file. The MDV then modifies its copy of the meta-data before responding to the command. Subsequently, when attempting to access its cached meta-data, the CAV detects that the meta-data is invalid and queries the MDV server for an updated copy of the meta-data.

Figure 19:
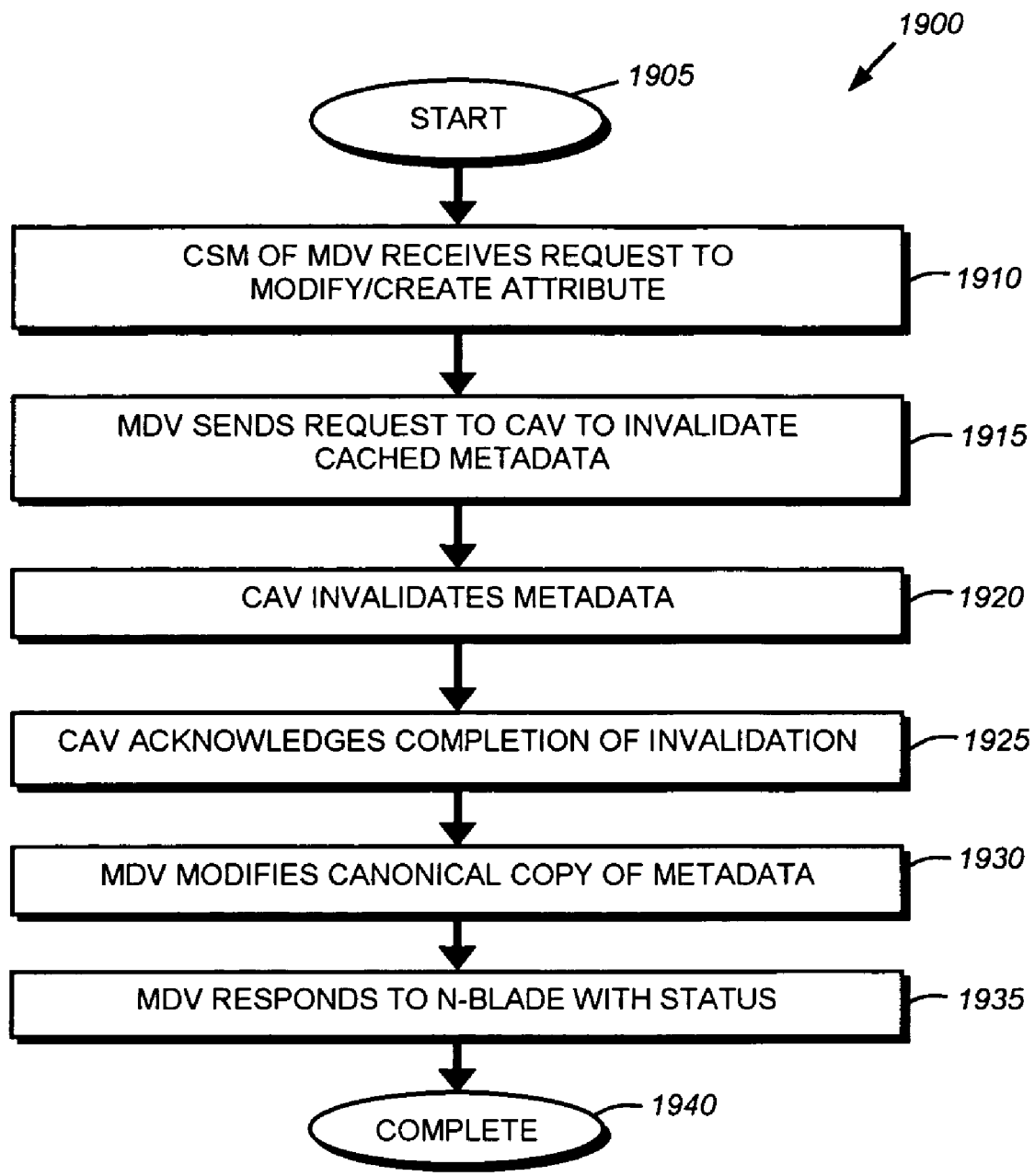
FIG. 19 is a flowchart of the steps of a procedure for modifying/creating attributes in accordance with an embodiment of the present invention.

FIG. 19 is a flow chart detailing the steps of a procedure 1900 for processing a modification or creation command directed to a file attribute in accordance with an embodiment of the present invention. The procedure 1900 begins in step 1905 and continues to step 1910 where the VSM serving the MDV receives a request to modify/create an attribute of a file. In the illustrative embodiment, all received requests for modifying/creating attributes are directed to the VSM of the MDV for processing and, to that end, each N-Blade is programmed to forward any such requests to the MDV. In response to receiving the request, the MDV sends a request to the CAV to invalidate its cached meta-data in step 1915. Upon receiving the request, the VSM of the CAV invalidates its meta-data by, for example, marking the meta-data invalidation flag 634 within the inode of the data volume as invalid. This causes the CAV to query the MDV to update its cached value before using the meta-data in any operation. Additionally, the VSM of the CAV transmits a request to all DVs to invalidate their cached meta-data. In response, each VSM of a DV invalidates its meta-data by, for example, asserting the meta-data invalidation flag 634. The CAV then acknowledges completion of the invalidation in step 1925. Upon receiving the acknowledgment, the MDV modifies the canonical copy of the meta-data per the received request in step 1930. The MDV then responds to the N-Blade in step 1935 before the procedure completes in 1940.

Figure 20:
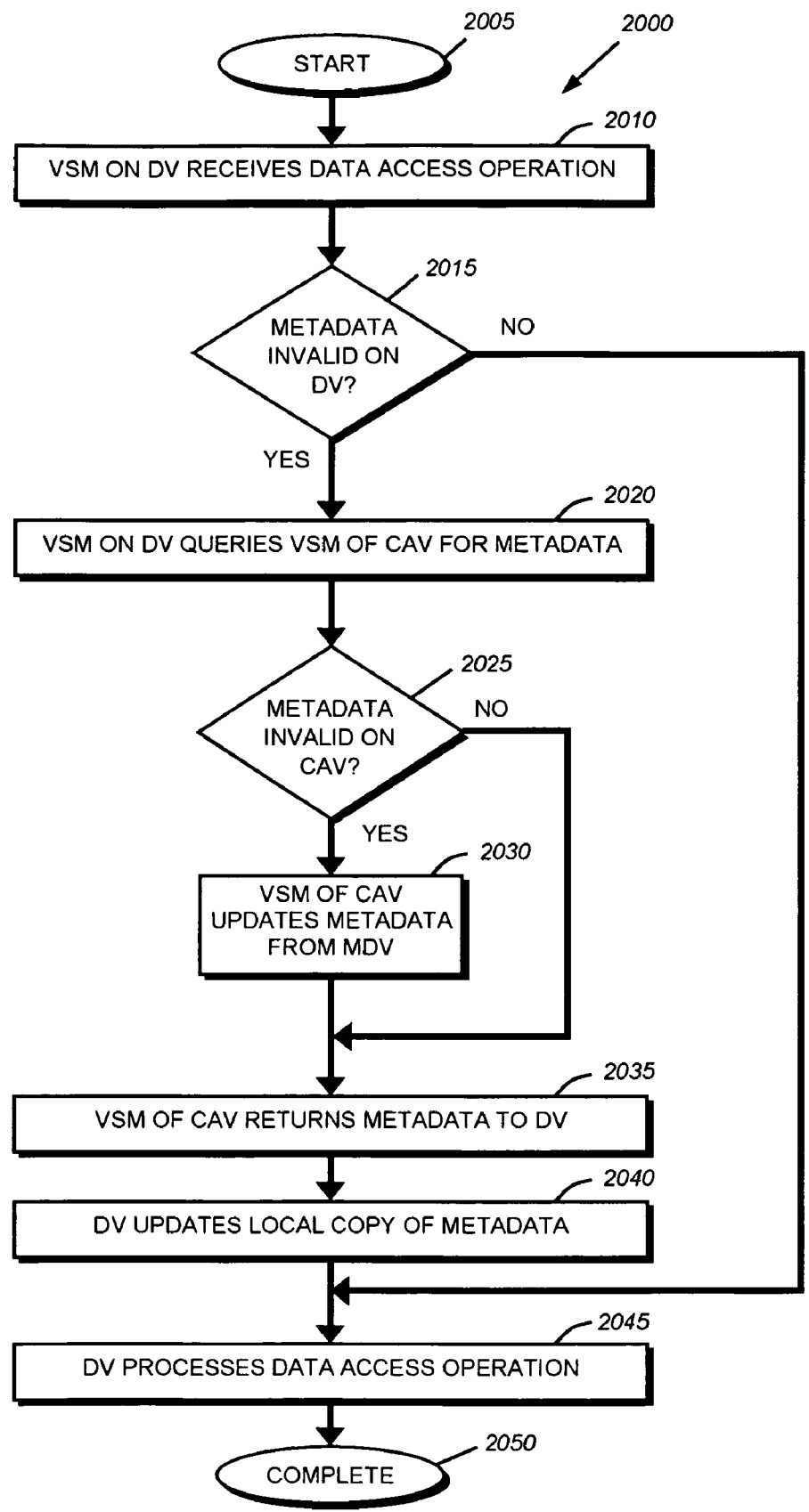
FIG. 20 is a flowchart of a procedure for processing a data access operation in accordance with an embodiment of the present invention.

FIG. 20 is a flow chart detailing the steps of a procedure 2000 for processing a data access operation in accordance with the novel multi-tier meta-data caching and distribution architecture of the present invention. The procedure 2000 begins in step 2005 and continues to step 2010 where a VSM of a data volume receives a data access operation directed to a file from, e.g., an N-Blade during normal cluster operation. In step 2015, the VSM first determines whether its local cached copy of meta-data (e.g., stored on the data volume) needed to process the operation is invalid. The VSM may render this determination by, for example, examining the meta-data invalidation flag 634 of the inode of the data volume to which the data access operation is directed. Note that, in alternate embodiments of the present invention, this determination may be rendered by determining whether a predetermined amount of time has elapsed since the data volume queried the CAV for the file. Such additional checks are described in the above-incorporated United States patent application entitled SYSTEM AND METHOD FOR GUARANTEEING CACHE CONSISTENCY IN A CLUSTER.

If the local cached copy of the meta-data is not invalid, the procedure branches to step 2045 where the VSM of the data volume processes the data access operation before completing in step 2050. However, if the cached meta-data is invalid on the data volume (step 2015), the procedure continues to step 2020 where the VSM on the data volume queries the VSM of the CAV for a current, updated copy of that meta-data. This VSM-to-VSM query may be accomplished by, for example, forwarding a CF command message from the D-Blade hosting the data volume to the D-Blade hosting the CAV. It should be noted that, since the role of the CAV is on a per file basis, the load of such queries is distributed among the various volumes and D-blades of the cluster servicing those volumes.

In step 2025, the VSM of the CAV determines whether its meta-data is invalid by, e.g., examining the meta-data invalidation flag 634 status in the inode of the appropriate file. Note that the meta-data may be invalid on the CAV for a number of reasons, one of which being that the meta-data, such as an access control list, has not yet been created. In addition, the CAV's meta-data may have been explicitly invalidated by the MDV while processing a modify/create command directed to an attribute. If the meta-data on the CAV is invalid, the procedure continues to step 2030 where the VSM of the CAV queries the VSM of the MDV for the current, updated version of the meta-data. Upon receiving and storing a current copy of the meta-data, the VSM of the CAV marks its cache as updated and valid by, e.g., de-asserting the meta-data invalidation flag 634.

In step 2035, the VSM of the CAV distributes the current copy of the meta-data to the VSM of the data volume which, in turn, updates its local cached copy of the meta-data in step 2040. In Step 2045, the VSM of the data volume then utilizes the meta-data when processing the data access operation and the procedure completes in step 2050. As can be appreciated from procedure 2000, the use of the CAV as a first tier caching and distribution point reduces the processing load on the MDV. Moreover, since each volume serves as the CAV for a portion of the files (data containers) stored on the SVS, the processing load is distributed among those SVS volumes. Accordingly, the novel multi-tier caching and distribution architecture reduces the processing load on the MDV to thereby obviate a processing bottleneck in the SVS.

In sum, the present invention advantageously facilitates (i) propagating of meta-data throughout the nodes of the cluster for storage on various volumes ("caches") of the SVS and (ii) updating of those caches in an efficient manner. That is, the novel multi-tier caching and distribution architecture reduces the latency incurred when acquiring and is updating such meta-data needed to service a data access request directed to a data container to thereby provide a high-performance cluster.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A computer-implemented method for distributing meta-data relating to a plurality of data containers in a striped volume set, comprising:

striping the data containers across a plurality of volumes configured to form the striped volume set, wherein the plurality of volumes are stored across a plurality of computers with each computer storing at least one volume and wherein each volume is a logical arrangement of a plurality of storage devices;

storing a canonical copy of the meta-data of each of the plurality of data containers in the striped volume set in a meta-data volume, wherein the canonical copy of the meta-data comprises an access control list;

organizing the meta-data into a plurality of categories, wherein a first category comprises meta-data that changes for every data access request served by the striped volume set, and wherein a second category comprises meta-data that is read for every data access request served by the striped volume set; and designating each data volume as a container attribute volume for at least one data container in the striped volume set, wherein the container attribute volume comprises the meta-data of the first category and the second category, and wherein the container attribute volume serves as a first tier caching and distribution point within the striped volume set.

2. The method of claim 1 further comprising:
receiving a request to modify/create the meta-data by a volume striping module serving the meta-data volume;
invalidating a cached copy of the meta-data stored on the container attribute volume; and
processing the request to modify/create the canonical copy of the meta-data.

3. The method of claim 2 wherein invalidating the cached copy of the meta-data further comprises setting a meta-data invalidation flag to identify that the cached copy of the meta-data is invalid.

4. The method of claim 2 wherein invalidating the cached copy of the meta-data further comprises transmitting a request to invalidate a cached copy of the meta-data on each data volumes.

5. The method of claim 1 wherein the container attribute volume is selected as the data volume storing a first stripe of data of the data container.

6. The method of claim 1 wherein the data container comprises a file.

7. The method of claim 1 wherein the data container comprises a logical unit number.

8. The method of claim 1 further comprising:
receiving, by a volume striping module serving one of the data volumes, a data access operation;
determining whether a copy of the meta-data stored on the data volume is valid;
in response to determining that the copy of the meta-data is not valid, requesting a volume striping module serving the container attribute volume to send a copy of cached meta-data to the volume striping module serving the data volume;
determining, by the volume striping module serving the container attribute volume, whether cached copy of the meta-data is valid; and
in response to determining that the container attribute volume's cached copy of the meta-data is not valid, updating the cached copy of the meta-data by querying the meta-data volume.

9. The method of claim 1 wherein the data container is a file and the meta-data comprises information about the file.

10. The method of claim 1 wherein the first category of meta-data comprises time stamps.

11. A computer-implemented system for distributing meta-data relating to a data container in a striped volume set, comprising:
a storage system operatively interconnected with one or more processors configured to store a canonical copy of the meta-data in a meta-data volume, wherein the canonical copy of the meta-data comprises an access control list;

the one or more processors configured to organize the meta-data into a plurality of categories, wherein a first category comprises meta-data that changes for every data access request served by the striped volume set, and wherein a second category comprises meta-data that is read for every data access request served by the striped volume set; and one or more data volumes configured to organized and to store stripes of data of the data container, wherein each of the data volumes is further configured to be designated as a container attribute volume for at least one data container in the striped volume set, wherein the container attribute volume comprises the meta-data of the first category and the second category, and wherein the container attribute volume serves as a first tier caching and distribution point within the striped volume set.

12. The system of claim 11 wherein the container attribute volume is selected as the data volume storing a first stripe of data of the data container.

13. The system of claim 11 wherein the data container comprises a file.

14. The system of claim 11 wherein the data container comprises a logical unit number.

15. The computer implemented system of claim 11 wherein the first category of meta-data comprises time stamps.

16. The computer implemented system of claim 11 wherein the data container is a file and the meta-data comprises information about the file.

17. A computer readable storage medium containing executable program instructions executed by a processor, comprising:
program instructions that stripe a plurality of data containers across a plurality of volumes configured to form a striped volume set, wherein the plurality of volumes are stored across a plurality of computers with each computer storing at least one volume and wherein each volume is a logical arrangement of a plurality of storage devices;

program instructions that store a canonical copy of meta-data of each of the plurality of data containers in the striped volume set in a meta-data volume, wherein the canonical copy of the meta-data comprises an access control list;

program instructions that organize the meta-data into a plurality of categories, wherein a first category comprises meta-data that changes for every data access request served by the striped volume set, and wherein a second category comprises meta-data that is read for every data access request served by the striped volume set; and program instructions that designate each data volume as a container attribute volume for at least one data container in the striped volume set, wherein the container attribute volume comprises the meta-data of the first category and the second category, and wherein the container attribute volume serves as a first tier caching and distribution point within the striped volume set.

18. The computer readable storage medium of claim 17 further comprising:
program instructions that receive a request to modify/create the meta-data by a volume striping module serving the meta-data volume;

program instructions that invalidate a cached copy of the meta-data stored on the container attribute volume; and program instructions that process the received request to modify/create the canonical copy of the meta-data.

19. The computer readable storage medium of claim 18 wherein the program instructions that invalidate the cached copy of the meta-data comprises:

program instructions that a meta-data invalidation flag to identify that the cached copy of the meta-data is invalid.

20. The computer readable storage medium of claim 18 wherein the program instructions that invalidate the cached copy of the meta-data comprises:

program instructions that transmit a request to one or more data volumes to invalidate a cached copy of the meta-data on each of the data volumes.

21. The computer readable storage medium of claim 17 wherein the container attribute volume is selected as the data volume storing a first stripe of data of the data container.

22. The computer readable storage medium of claim 17 wherein at least one data container comprises a file.

23. The computer readable storage medium of claim 17 wherein at least one data container comprises a logical unit number.

24. The computer readable storage medium of claim 17 further comprising:

program instructions that receive, by a volume striping module serving one or more data volumes, a data access operation;

program instructions that determine whether a copy of the meta-data stored on the one or more data volumes is valid;

in response to determining that the copy of the meta-data is not valid, program instructions that request a volume striping module serving the container attribute volume to send a copy of cached meta-data to the volume striping module serving the one or more data volumes;

program instructions that determine, by the volume striping module serving the container attribute volume, whether cached copy of the meta-data is valid; and in response to determining that the container attribute volume's cached copy of the meta-data is not valid, program instructions that update the cached copy of the meta-data by querying the meta-data volume.

25. The computer readable storage medium of claim 17 wherein the at least one data container is a file and the meta-data comprises information about the file.

26. The computer readable storage medium of claim 17 wherein the first category of meta-data comprises time stamps.

* * * * *

UNITED STATES PATENT AND TRADEMARK OFFICE
CERTIFICATE OF CORRECTION

| | | |
|---|---|---|
| PATENT NO. | : 7,698,334 B2 | Page 1 of 1 |
| APPLICATION NO. | : 11/119277 | |
| DATED | : April 13, 2010 | |
| INVENTOR(S) | : Michael L. Kazar | |

It is certified that error appears in the above-identified patent and that said Letters Patent is hereby corrected as shown below:

Col. 10, Line 8, should read end,[[ is]] each blade includes a cluster fabric (CF) interface Col. 22, Line 35, should read the latency incurred when acquiring and[[ is]] updating such Col. 23, Line 34, should read data volume[[s]]

Col. 25, Line 8, should read identify that set the cached copy of the meta-data is invalid.

Signed and Sealed this

Sixteenth Day of November, 2010

David J. Kappos
*Director of the United States Patent and Trademark Office*